Figure 1:
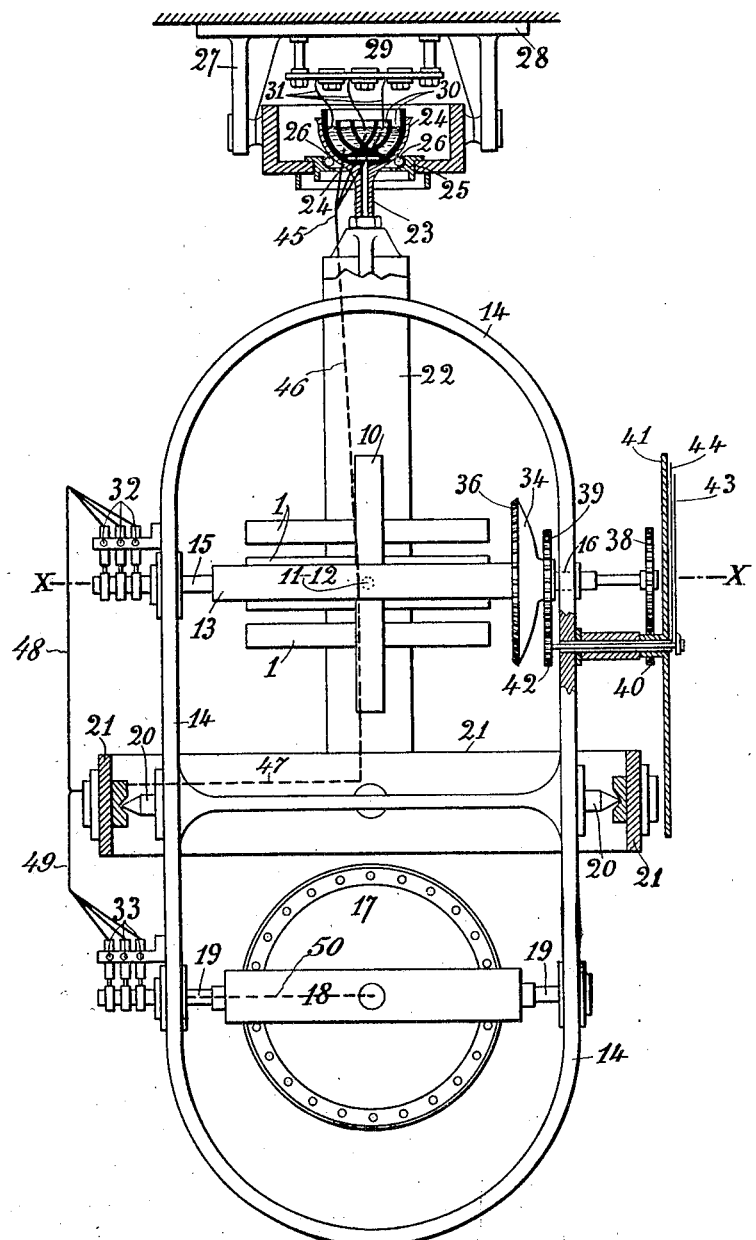

No. 844,837. PATENTED FEB. 19, 1907.
F. VANZINI.
NAUTICAL APPARATUS.
APPLICATION FILED MAY 26, 1905.

2 SHEETS—SHEET 1.

WITNESSES:—
William M. Hilberts
Herbert G. Whipple

INVENTOR
Filippo Vanzini
BY
ATTORNEY Albert Nathan

No. 844,837. PATENTED FEB. 19, 1907.
F. VANZINI.
NAUTICAL APPARATUS.
APPLICATION FILED MAY 26, 1905.

2 SHEETS—SHEET 2.

WITNESSES:
William M. Hilbert
Herbert E. Whittle

INVENTOR
Filippo Vanzini
BY
ATTORNEY Albert Nathan

UNITED STATES PATENT OFFICE.

FILIPPO VANZINI, OF BOLOGNA, ITALY.

NAUTICAL APPARATUS.

No. 844,837.　　　Specification of Letters Patent.　　　Patented Feb. 19, 1907.

Application filed May 26, 1905. Serial No. 262,330.

*To all whom it may concern:*

Be it known that I, FILIPPO VANZINI, second lieutenant R. I. N., a subject of the King of Italy, and resident of Via Crefici 4, Bologna, Italy, have invented a new and useful Nautical Apparatus, of which the following is a specification.

This invention relates to improvements in instruments which independently of astronomical observations may be used in accurately determining the geographical coordinates occupied by a ship throughout its course; and it more particularly concerns a structure for so doing in an automatic manner and without any auxiliary reference other than to the usual ship chronometer.

Heretofore the determination of the latitude and longitude occupied by a ship has necessitated recourse to astronomical observation, and this in stormy weather is most difficult, and in such cases it has been necessary to rely for a great part upon approximations of the distance traveled by a ship obtainable from the ship's log, which distances are only reducible to geographical coordinates by computing therewith the factors of the lapsed time taken from the chronometer and the directions traveled taken from the compass. It will be apparent that such methods afford great facilities for the introduction of errors.

My invention contemplates a continuously-operating apparatus which automatically gives readings directly capable of being interpolated with the aid of a chronometer into degrees of latitude and longitude.

Further objects of this invention lie in the production of an instrument capable of being produced at small cost and which embodies a system of simple coöperating elements in such a manner that needless complications in the operation of the same will be eliminated.

Other objects and advantages of this invention will be in part obvious and in part more specifically pointed out hereinafter, and with these and other ends in view my invention accordingly consists in the combination of parts, features of construction, and arrangement of elements hereinafter more explicitly shown as an exemplification of the embodiment of the invention.

That the same may be more fully understood and made comprehensible by those skilled in the arts to which it relates, I have appended drawings of a preferred embodiment thereof, and now upon making reference to such drawings by means of reference-letters, which similarly denote corresponding parts throughout all the views, it will be seen that—

Figure 2:
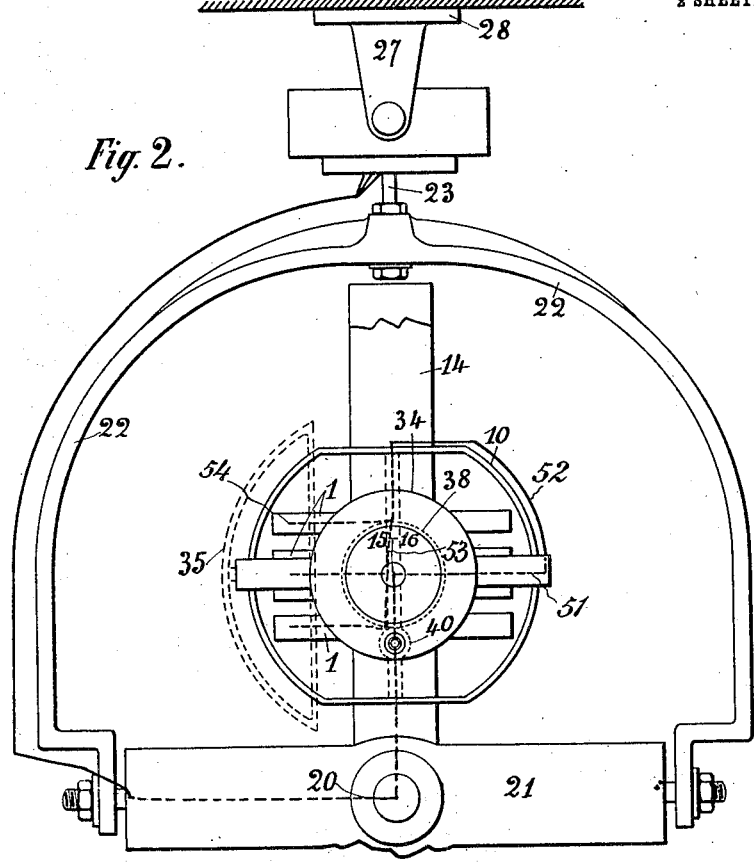
Figure 3:
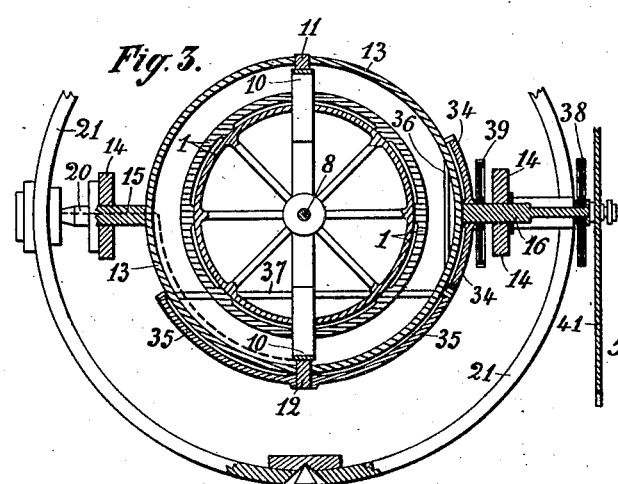
Figure 4:
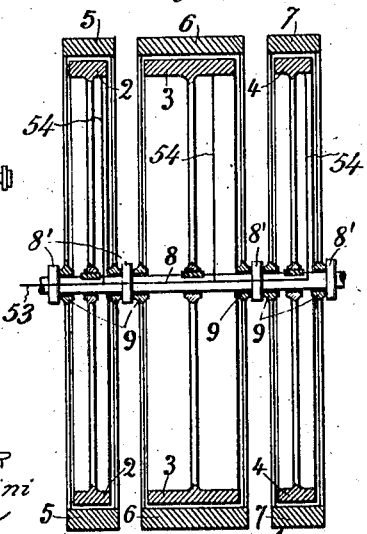

Figure 1 shows a vertical detailed sectional view of the complete apparatus. Fig. 2 illustrates a like view taken on a vertical plane at right angles to the former figure. In this view the dial and pointers marking the variations of the geographical coördinates have been removed, as well as certain underlying features of the same, in order that clearness may be had. In dotted lines is indicated the position of the large spherical calotte, hereinafter referred to. Fig. 3 is a horizontal section taken on line $x\ x$ of Fig. 1 and showing in detail further features of the variable connections governing the movement of the pointers. Fig. 4 is a section taken through the upper gyroscope and more clearly showing the arrangement for equilibrating the same.

Referring to the drawings now more specifically by means of reference-letters, it will be observed that the present embodiment comprises two independently-operating gyroscopes 1 and 17, respectively. The construction and working of my invention depends upon the well-known principle that the axis of a freely-suspended and rapidly-rotating gyroscope tends to preserve an invariable direction in space, particularly when the gyroscope is well balanced. It follows that if such a gyroscope be mounted on board a ship, with its axis inclining in a direction normal to the surface of the sea—that is, pointing toward the center of the earth—then a translation of the ship around the curvature of the earth will have no effect upon the absolute direction of the axis, which will remain invariable, but which in the new position of the ship will be inclined out of the new normal in such a manner that the projections of the angle with the axis and such normal, respectively, on the planes of the parallel and of the meridian will determine the variations in latitude and longitude between the points through which the ship has passed. It is to be noted in this connection that the rotation of the earth will have a like effect upon the gyroscope, but that such variation is absolutely uniform and determinable by a reference to the ship chronometer, which for every twenty-four hours lapsed will denote a variation of three hundred and sixty degrees on the chronometer. Accordingly the aforesaid gyroscope 1 is perfectly balanced and free to preserve an invariable axial position with respect to the suspending frame, which likewise by means gyroscope 17 is maintained in a series of positions always parallel with one another, and by means of an index mechanism the variations between the position occupied by the frame and the gyroscope 1 is always readily ascertainable.

I prefer to construct the gyroscope 1 in the manner shown by Fig. 4 in order that the same may be as perfectly balanced as possible. This consists of three inductors 2, 3, and 4, respectively, which are fixed and keyed onto the shaft 8, which does not rotate relatively to such inductors. Armatures 5, 6, and 7 are revolubly mounted, by means of suitable hubs 9, upon said shaft 8, and usually such armatures will rotate around the periphery of the above-mentioned inductors. The masses of the latter, as designated by 2 and 4, are equal to one another, as are their moments of inertia with respect to the axis of shaft 8, and combined their sums are equal, respectively, to the mass and to the moment of inertia with respect to the axis of the same shaft 8 of inductor 3. A like relation exists between the armatures 5 and 7 and with respect to the armature 6. In order that the lateral displacement of such armatures 5, 6, and 7 may be prevented, fixed collars may be provided upon the shaft 8, adjacent the hubs 9, in a manner such as will be readily comprehensible to any ordinary mechanic, and therefore such collars or sleeves have not been more specifically detailed. It is to be understood that these gyroscopes are to be continuously rotated at high speed, which may be done, preferably, by electrical means, such as the employment of any ordinary three-phase motive system, the gyroscopes being of course especially adapted therefor. This also will be readily understood and capable of application by those skilled in the electrical arts, and therefore the electrical connections need only be briefly considered hereinafter.

The gyroscopes are mounted in a freely-suspended frame, swung from a joist 28 of the ship. From such joist depend brackets 27 and pivotally carry a support 25, furnished with a circular hole circumscribing which is an annular groove wherein are arranged a series of small balls 26. A hemispherical bowl 24 rests directly upon said balls in order to reduce to the lowest degree the frictional resistance. An extension-bar 23 depends from said bowl and suspends the large fork 22, which, as shown particularly in Figs. 2 and 3, pivotally carry a large ring 21. (Shown best in Fig. 1.) At right angles to fork 22 the frame 14, together with all the features carried thereby, oscillates on pivots 20, provided on the large ring 21. In order that the system may be maintained vertically and against oversetting, the plane of the large ring 21 is situated somewhat above the center of gravity of the structure carried by the pivots 20. It will be obvious that by this system of gimbals the frame 14 and the features carried thereby are capable of being readily positioned in any direction with respect to the supporting-joist, and that the same will remain unaffected by any pitching or rolling of the ship. Such frame, however, is maintained in radial planes intersecting in parallel lines regardless of the direction of travel of the ship or of any steering or turning thereof. This is accomplished through the instrumentality of the lower gyroscope 17, which is mounted with its axis lying parallel to the axis of the earth, such axis of the gyroscope being pivotally bearing in ring 18, which in turn and at right angles to the gyroscope's axis is connected to frame 14 by pivots 19. The actuating means for this gyroscope is electrical and the connection will be referred to hereinafter.

In order that the apparatus will work with a high degree of precision, it is desirable that the above-enumerated pivotal connections be made as frictionless as possible, and in this case it will be observed that the invariable north and south pointing of the axis of gyroscope 17 will prevent the frame 14 from assuming positions other than in planes intersecting in parallel lines, the intersections being always normal to the axis of the earth and the planes being always radially extending from the center of the earth. It will also be noted that within ordinary limits the small errors caused by the frictional resistance of the frame to being maintained in the aforesaid positions will tend to counterbalance and eliminate themselves on account of the opposing forces resulting from the deviations in the course of the vessel, and also from the fact peculiar to gyroscopes that a tendency to turn the axis of such gyroscope in a given plane will, in fact, cause the gyroscope to actually assume a corresponding angular deviation in a plane at right angles to that with in which such tendency is acting. Thus while the gyroscope 17 may from various forces be brought to assume an angular direction, such will not carry the frame 14 through a corresponding deviation. Such slight angular changes in the axis of the gyroscope may be readily eliminated by forcibly bringing the same to a true N S position from time to time.

The indicating-gyroscope 1 is suspended on two concentric rings 10 and 13, respectively, its axis 8 having a normal or other angular direction with respect to the plane of the horizon. Such axis terminates along a diameter of the inner ring 10 in pivotal bearings, and such inner ring 10 is pivoted to a second circumscribing ring 13 by means of pivots 11 and 12, located at right angles to the shaft 8, thereby constituting a perfect set of gimbals. This system is also revolubly mounted in frame 14, by means of pivots 15 and 16, emanating from said ring 13 at points normal to the diameter passing through pivots 11 and 12, respectively.

It will be observed that gyroscope 1 is free to assume any axial direction whatever regardless of the positions occupied by its mounting. It is from variations in the angular positions of such axis 8 that the longitude and latitude of the ship is ascertainable, and while any other suitable means for conveniently indicating such deviations may be employed I prefer in practice to make use of the indicating instrumentality now to be more specifically described.

For indicating movements of the ship on and along parallels of latitude—such, for example, as the equator—a spherical calotte 35 is affixed to pivot 12 of ring 10, so as to be carried and revolved by the same. Such calotte is provided with a toothed periphery in the manner of a bevel-wheel and is in gear with a corresponding calotte 34, revolubly mounted on pinion 16 and carrying with it a gear-wheel 39, which by means of a pinion 42 (shown in Fig. 1) turns an index-pointer 43, and thereby indicates degrees of longitude upon a dial 41, hereinafter referred to.

For indicating movements of the ship on and along parallels of longitude, the pivot 16 of ring 13 is extended so as to carry a gear-wheel 38, which is in mesh with a pinion 40, affixed to dial 41, which is revolubly mounted upon a suitable sleeve extending from frame 14. It will be apparent that a revolution of ring 13 will cause a corresponding revolution in dial 41.

A fixed pointer 44 is positioned immovably with respect to frame 14, and such pointer 44 designates degrees of latitude upon the dial. The toothed wheels 38 and 39, as here shown, have equal diameters, and mesh with pinions 42 and 40, also of equal diameter; but the ratio of such gearing is quite arbitrary and may be varied at will, as the sole object sought to be attained is the amplification of the variations shown by the pointers.

The operation of the apparatus is as follows: When the ship begins her course, the axis of the inferior gyroscope 17 is placed in a direction parallel to the terrestrial axis, in order that the rotary motion of the earth should not exercise any perturbation and to insure the frame 14 being maintained in the aforesaid positions. The superior gyroscope is placed with its axis normal to the terrestrial axis and thereupon is completely felt the rotary motion of the earth and the axis of such superior gyroscope will continually and uniformly rotate in a plane normal to the axis of the earth at a rate of three hundred and sixty degrees for each twenty-four hours. This rotation, however, does not introduce errors into the operation of the apparatus, since the amount of such rotation is easily determined from a reference to the ship's chronometer, and, if so preferred, it will be merely a matter of mechanical skill to incorporate clockwork into my apparatus in such a manner as to eliminate the effect of the earth's rotation. Assuming now for purposes of explanation that the apparatus is not affected by the rotation of the earth and noting that all pitching and rolling of the ship is neutralized by means of the gimbal mechanism aforesaid, and that the lower gyroscope 17 preserves unaltered the position of the apparatus in the direction N S, let us suppose that the ship is situated at a point of the equator being the origin of the enumeration of longitude and that the face of the dial is directed toward the west (the observer looking at Fig. 1 from the north in a line normal to the paper and extending to the south) and that the axis of the gyroscope is vertical, as well as the pointer 43 and 44, both indicating zero on the quadrant. If the ship is sailing on the equator or along a parallel of latitude, the frame 14 will travel along a plane preserving its initial N S position, and the axis of the principal gyroscope will always be inclined in the ship's longitudinal medium plane, which now lies in the direction of the normal to the medium plane of the ship when the latter traverses such meridian. The angular deviations of the axis will thus cause the ring 10 to rotate on its axes 11 and 12, carrying with it in revolution calotte 35 and therethrough calotte 34, to which the longitudinal indicating-pointer 43 is affixed. Such motion will in no wise affect dial 41 or pointer 44, which will both remain immovable. Consequently the pointer 43 will read directly in degrees of longitude traversed by the ship. The degrees of latitude are indicated by the relative displacement of disk 41 and pointer 44. If the ship advances a certain arc along the meridian, the axis of the gyroscope will rotate through a corresponding angle without any lateral displacement—that is, will rotate through a plane at right angles to frame 14. This movement will cause ring 13 to revolve about axes 15 and 16, the latter carrying therewith gear 38 and therethrough rotating disk 41. It will be noted that pointer 44, however, will remain motionless and the angular displacement of these parts will give the reading in degrees of latitude. Such motion in no wise affects the relation of disk 41 to the aforesaid pointer 43, since the ring 13 in its rotation also carries with it calotte 35 and calotte 34, rotating the latter just as though it were affixed to pinion 16, and through the gearing aforesaid pointer 43 will be rotated at the same rate as pointer 41. If the vessel advances through any other arc, it is evident that combined movements will take place in the apparatus embodying the elementary ones, as described, producing a resultant relative readjustment of disk 41 and pointers 43 and 44, thereby determining the variations of both latitude and longitude. In using the apparatus the various pointers may be adjusted so as to indicate zero at the beginning of the voyage, and then the subsequent indications of the apparatus will directly denote the variations of latitude and longitude to be added to or subtracted from the geographical coördinates of the point of departure. If preferred, however, the apparatus may be adjusted to preliminarily denote the exact geographical coördinates of the locality from which the start is made. In such case the subsequent indications will read directly in actual and absolute geographical coördinates without the necessity of interpolation. Experiment will indicate the constance of corrections made necessary in connection with the reading of the instrument. In propelling these gyroscopes I prefer to make use of a three-phase system, and in order that the current may be properly led into the armatures, constituting features of the gyroscope, I have arranged within the hemispherical bowl 24 a cup of insulating material provided with three concentric grooves or channels 30, filled with mercury and into which the three conductors 31 from main circuit-posts 29. It will be apparent that a uniform connection will be insured by this arrangement regardless of any motion or swinging of the apparatus. From such grooves a series of conductors 45 separately pass out and continue through a main cable around fork 22, as indicated by 46, then passing along the pivotal connection with such fork and ring 21, and passing around the latter, as shown by 47, to the point of pivot of the latter with frame 14, and thence by 48 to the binding-posts 32 and by 49 to the binding-posts 33. From such posts the cables respectively lead to the windings on the gyroscopes. Fig. 2 shows particularly the path of the cable leading to gyroscope 1, in which it passes from the binding-posts 32 along the pivot 15 and around ring 13, as indicated by 51, which denotes the cable in such course; then around ring 10, as indicated by 52. Then the current passes, by means of suitable well-known connections, along the course on the axis of the gyroscope (indicated by 53) and from thence the conductors 54 branch out to the inductors of the gyroscope 2, 3, and 4 in a manner shown and understood. In a like manner a cable passes from the binding-posts 33 through 50 to the inductors of the gyroscope 17. The motive force may, if preferred, be a direct current and may be applied in any preferred manner.

By inspecting the following claims certain other variations which may be resorted to within the scope of this invention will be made apparent.

I claim—

1. In a nautical apparatus, an instrument mounted to maintain a constant axial direction in space, means positioning said instrument in said direction, a dial and a mechanism for indicating on a common dial the angular deviations from normals to the earth of such instrument as it is moved relatively to the earth, whereby latitude and longitude changes are both made apparent.

2. In a nautical apparatus, an instrument mounted to maintain a constant axial direction in space, a supporting-frame therefor, means constraining said frame to lie in parallel planes, and having a horizontal axis mounted to maintain a constant direction, means maintaining said axis in said direction and means for indicating angular deviations between said supporting-frame and fixed instrument.

3. In a nautical apparatus, an instrument mounted to maintain a constant axial direction in space, a supporting-frame therefor, a gyroscope for maintaining such frame with its horizontal axis normal to the terrestrial axis, and a dial and pointers geared to indicate angular deviations of the aforesaid frame and supported instrument.

4. In a nautical apparatus, a gyroscope mounted to maintain a constant axial direction in space, a supporting-frame therefor comprising a horizontal axis and a system of gimbals for freely carrying said gyroscope, means maintaining said frame with its horizontal axis in parallel positions and an indicating means for denoting angular deviations between said gyroscope and a normal to the surface of the earth.

5. In a nautical apparatus, a gyroscope mounted to maintain a constant axial direction in space, a supporting-frame therefor comprising a horizontal axis and a series of gimbals for freely carrying said gyroscope, a secondary gyroscope mounted within said frame whereby the latter is constrained to lie with its horizontal axis normal to the terrestrial axis, and indicating means for denoting angular deviations between said gyroscope and a normal to the surface of the earth.

6. In a nautical apparatus, a gyroscope mounted to maintain a constant axial direction in space and at an angle to the terrestrial axis, a supporting-frame therefor comprising a horizontal axis, means constraining said frame to lie normal to the earth with its horizontal axis perpendicular to the terrestrial axis, and indicating means for denoting angular variations between the gyroscope and frame.

7. In a nautical apparatus, two gyroscopes, the one mounted to maintain a constant axial direction in space, and the other to similarly maintain a constant axial direction in space at an angle to the aforesaid gyroscope, and means for indicating angular deviations between said gyroscopes as the apparatus is moved from point to point on the terrestrial sphere.

8. In a nautical apparatus, two gyroscopes the one mounted to maintain a constant axial direction in space, parallel to the terrestrial axis, and the other to similarly maintain a constant axial direction in space at an angle to the aforesaid gyroscope, a supporting apparatus for said gyroscopes and means for indicating angular deviations between said gyroscopes as the supporting apparatus therefor occupies dissimilar terrestrial locations.

9. In a nautical apparatus, a frame swung upon gimbals permitting it to occupy any relative angular position in space, two gyroscopes carried thereby, the one mounted in gimbals permitting it to assume any angular position in space with respect to said frame, and the other mounted with its axis normal to the plane of said frame whereby the latter is prevented from rotating about a vertical axis but without constraining its movement about a horizontal axis, and indicating means for showing and measuring the angular deviations between said frame and the freely-supported gyroscope.

10. In a nautical apparatus, a gyroscope mounted to maintain a constant axial direction in space, said mountings comprising a supporting-frame having a horizontal axis constrained to lie normal to the terrestrial axis, a pair of concentric rings mounted within said frame to comprise a system of gimbals for freely carrying said gyroscope, and an indicating means for measuring angular deviations between said gyroscope and supporting-frame and comprising pointers each actuated by one of the aforesaid concentric gimbal-rings.

11. In a nautical apparatus, a gyroscope mounted to maintain a constant axial direction in space, said mountings comprising a supporting-frame having a horizontal axis which is constrained to point normal to the terrestrial axis, a pair of concentric gimbal-rings mounted within said frame and freely carrying said gyroscope, a dial and two pointers geared to said rings whereby angular rotations of each of said rings will be correspondingly designated on said dial by corresponding pointers.

12. In a nautical apparatus, a gyroscope, a frame freely supporting the same whereby it may be turned in any direction relatively to said frame, and a differential means carried by said frame for indicating the components of such relative movement.

13. In a nautical apparatus, a gyroscope, a frame freely supporting the same whereby a relative displacement in any direction may be had, an index for measuring such angular displacement in one plane, an independently-operating index for measuring such angular displacement in a plane normal to the preceding, and a differential means for actuating said indices.

14. In a nautical apparatus, a gyroscope, a frame supporting the same whereby a relative displacement may be had freely in any direction, an index for measuring the component of such angular displacement along one plane, an index for measuring the component of such displacement in a plane normal to the preceding, and a differential movement means for actuating said indices.

15. In a nautical apparatus, an instrument mounted to maintain a constant axial position in space, a supporting-frame therefor having an axis and constrained to lie with an axis in parallel positions comprising a pair of gimbals pivoted at normal diameters whereby a displacement of the supporting-frame with respect to the constant-direction axis will be resolved by said gimbals into components along normal directions, an index operable from one of said gimbals to measure the angular motion thereof, and an index operable from the other gimbal to measure its angular motion.

16. In a nautical apparatus, a gyroscope mounted to maintain a constant axial direction in space, a supporting-frame therefor comprising a horizontal axis which is constrained to lie with its horizontal axis in a constant direction in space, a pair of concentric gimbal-rings pivoted together along normal diameters, means connected with one of said rings for denoting the angular rotation thereof, and means connected with the other ring for denoting its angular deviation.

17. In a nautical apparatus, an instrument mounted to maintain a constant axial direction in space, a supporting-frame therefor comprising a horizontal axis which is maintained gyroscopically in a constant direction, a pair of concentric gimbal-rings pivoted together along normal diameters, means connected with one of said rings for denoting the angular rotation thereof, and means connected with the other ring for denoting its angular deviations.

18. In a nautical apparatus, a gyroscope mounted to maintain a constant axial direction in space, a supporting-frame therefor comprising a horizontal axis and a series of gimbals pivotally attached along normal diameters for freely carrying said gyroscope, a secondary gyroscope mounted within said frame whereby the latter is constrained to lie with its horizontal axis normal to the terrestrial axis, and an indicating means attached to each of said gimbals for denoting the angular deviations thereof with respect to a normal to the surface of the earth.

19. In a nautical apparatus, a gyroscope mounted to maintain a constant axial direction in space and at an angle to the terrestrial axis, a supporting-frame therefor means gyroscopically constraining said frame to lie normal to the earth with its horizontal axis perpendicular to the terrestrial axis, and indicating means for denoting the angular variations along normal planes between the gyroscope and the frame.

20. In a nautical apparatus, two gyroscopes, the one mounted to maintain a constant axial direction in space, and the other to similarly maintain a constant axial direction in space at an angle to the aforesaid gyroscope, and means for indicating the angular deviations along normal planes between said gyroscopes as the apparatus occupies dissimilar terrestrial locations.

21. In a nautical apparatus, a pair of gyroscopes, the one being mounted to maintain a constant axial direction parallel to the terrestrial axis, and the other to similarly maintain a constant axial direction in space at an angle to the aforesaid gyroscope, a supporting apparatus and means for indicating angular deviations along normal planes between said gyroscopes as the supporting apparatus traverses the surface of the earth.

22. In a nautical apparatus, a frame pivoted within dependent gimbals permitting it to occupy any relative angular position in space with respect to a vessel carrying the apparatus, two gyroscopes mounted within said frame, the one within gimbals permitting it to assume any angular position in space with respect to said frame, and the other mounted with its axis parallel to the terrestrial axis whereby such frame is prevented from rotating about a vertical axis without constraining its movement about a horizontal axis, and means for indicating and measuring the angular deviations along normal planes between said frame and the freely-supported gyroscope.

23. In a nautical apparatus, a gyroscope mounted to maintain a constant axial direction in space, said mountings comprising a supporting-frame, an outer ring pivoted thereto, an inner ring pivoted in a normal diameter to said outer ring, said inner ring containing aforesaid gyroscope, and means for measuring angular deviations of said rings with respect to said frame, comprising a pointer immovably positioned relative to said frame, and a disk and pointer movable without relative displacement by a rotation of the outer ring, said pointer alone being revolved by a rotation of said inner ring.

24. In a nautical apparatus, a gyroscope, a frame freely supporting the same, a pointer fixed with respect to said frame, a dial, another pointer and means connected to said gyroscope whereby said dial and pointer will rotate together with respect to said stationary pointer during an angular displacement of said frame and gyroscope in a plane normal to the former; and whereby said pointer will alone rotate during an angular displacement of said frame and gyroscope in the plane of the former.

25. In a nautical apparatus, an instrument mounted to maintain a constant axial position in space, a supporting-frame therefor comprising a pair of gimbals pivoted at normal diameters whereby a displacement of the supporting-frame with respect to said instrument will be resolved by said gimbals into component angular rotations along normal planes, an index fixed to said frame and a dial and another index operable from said gimbals, said dial being directly geared to one of said gimbals and said pointer to the other whereby an independent rotation of the latter will rotate said index without affecting said dial, and an independent rotation of the former gimbal will rotate said index and said dial at a like angular velocity.

26. In a nautical apparatus, a gyroscope, mountings therefor comprising a supporting-frame, an outer ring pivoted thereto, an inner ring pivoted transversely within said outer ring, and containing the aforesaid gyroscope, a gear affixed to the pivot of said inner ring and revoluble thereby, said gear being beveled to a gear revoluble about the axis of the outer ring and a pointer positively actuated thereby, another pointer or dial connected to and positively actuated by the axis of said outer ring, and a pointer affixed to said supporting-frame.

27. In a nautical apparatus, a gyroscope, an inner ring pivotally supporting the same and mounted to revolve within an outer ring, the latter being mounted with its axis normal to the axis of the inner ring upon a freely-suspended frame, a calotte revolubly carried by said inner ring in engagement with a calotte loosely mounted on the axis of the outer ring, and positively actuating a pointer, a dial connected to and positively actuated by the axis of said outer ring, and a fixed pointer attached to said frame, the latter being constrained gyroscopically with its horizontal axes in a constant direction.

28. In a nautical apparatus, a gyroscope, mountings therefor comprising a supporting-frame, an outer ring pivoted thereto and positively actuating from its axis a dial, an inner ring transversely pivoted within said outer ring and positively actuating from its axis by means of a calotte, a gear loosely mounted on the axis of the outer ring and carrying a pointer, a like pointer affixed to said frame, said frame carrying an auxiliary gyroscope for maintaining its horizontal axis in constantly parallel directions.

29. In a nautical apparatus, a frame carrying gyroscopes and angular deviations-measuring instrumentalities, said frame being mounted in gimbals dependent from a ball-and-socket joint, the latter being provided with a plurality of balls intermediate the opposing faces thereof to reduce friction.

30. In a nautical apparatus, a frame carrying gyroscopes and indicating means therefor, and gimbals suspending said frame, brackets pivotally carrying a bearing-block having a bottom aperture, a channel around the opening and a series of balls with said channel, a hemispherical journal resting upon and dependent from said balls and affixed to said gimbals.

31. In a nautical apparatus, a means for making electrical constants through a universal joint, comprising a hemispherical bowl provided with a series of concentric grooves, a fluid conductor in said grooves, and conductors of solid material terminating within said fluid material.

32. In a nautical apparatus, means for conducting a three-phase circuit through a universal joint, comprising a hemispherical bowl of insulating material having a series of concentric grooves, conductors leading therefrom along a shaft mercury within said grooves, and springy metallic conductors leading from above and terminating in said mercury.

33. In a nautical apparatus, an electrically-operated gyroscope, and means for making electrical connections therewith comprising a hemispherical ball provided with a series of concentric grooves, a fluid conductor in said grooves, and conductors of solid material making connection with said fluid conductor.

In testimony whereof I affix my signature in presence of two witnesses.

FILIPPO VANZINI.

Witnesses:
EDOARDO TAGLIAVACCA,
ENRICO FERRARIA.